United States Patent
Fröberg Olsson et al.

(10) Patent No.: US 11,601,229 B2
(45) Date of Patent: Mar. 7, 2023

(54) RE-TRANSMISSION TIMING FOR ACKNOWLEDGMENT SIGNALING

(71) Applicant: Telefonaktiebolaget LM Ericsson (publ), Stockholm (SE)

(72) Inventors: Jonas Fröberg Olsson, Ljungsbro (SE); Martin Hessler, Linköping (SE); Gustav Wikström, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/487,726

(22) PCT Filed: Mar. 3, 2017

(86) PCT No.: PCT/SE2017/050201
§ 371 (c)(1),
(2) Date: Aug. 21, 2019

(87) PCT Pub. No.: WO2018/160109
PCT Pub. Date: Sep. 7, 2018

(65) Prior Publication Data
US 2020/0036485 A1    Jan. 30, 2020

(51) Int. Cl.
*H04L 1/18* (2006.01)
*H04L 1/1867* (2023.01)
*H04L 1/1829* (2023.01)

(52) U.S. Cl.
CPC .......... *H04L 1/1887* (2013.01); *H04L 1/1864* (2013.01)

(58) Field of Classification Search
CPC ... H04L 1/1887; H04L 1/1864; H04L 1/1812; H04L 1/1896; H04L 1/1822;
(Continued)

(56) References Cited

U.S. PATENT DOCUMENTS

2009/0327829 A1* 12/2009 Yang ............... H04L 1/1829
                                                714/E11.01
2010/0027460 A1*  2/2010 Kim ............... H04L 1/1874
                                                   370/315
(Continued)

FOREIGN PATENT DOCUMENTS

CN    101132259 A      2/2008
CN    102474391 A *    5/2012 ......... H04L 1/1887
(Continued)

OTHER PUBLICATIONS

International Search Report and Written Opinion dated Sep. 11, 2017 for International Application No. PCT/SE2017/050201 filed on Mar. 3, 2017, consisting of 11-pages.
(Continued)

*Primary Examiner* — Michael K Phillips
(74) *Attorney, Agent, or Firm* — Christopher & Weisberg. P.A.

(57) ABSTRACT

There is disclosed a method of operating a radio node in a Radio Access Network, RAN. The method includes transmitting, according to a transmission timing, a data element of a data stream associated to an acknowledgement signaling process. The transmission timing is determined based on a retransmission indication indicating whether the data element is to be transmitted the first time in the data stream, or is to be retransmitted in the data stream. The disclosure also pertains to related methods and devices.

20 Claims, 5 Drawing Sheets

Receive a uplink grant granting a uplink transmission

Obtain a indicator indicating whether the transmission is a new transmission or a re-transmission Determine a transmission timing based on the obtained indicator

(58) Field of Classification Search
CPC ....... H04L 1/1861; H04L 1/1893; H04L 1/18; H04W 72/042; H04W 72/0446; H04W 72/0406; H04W 72/1289; H04W 88/02; H04W 72/04; H04W 52/48
See application file for complete search history.

(56) References Cited

U.S. PATENT DOCUMENTS

| | | | |
|---|---|---|---|
| 2013/0051269 A1* | 2/2013 | Suzuki | H04L 1/1877 370/252 |
| 2015/0282130 A1* | 10/2015 | Webb | H04L 1/08 370/329 |
| 2015/0327229 A1 | 11/2015 | Zhang et al. | |
| 2015/0365198 A1 | 12/2015 | Tabet et al. | |
| 2016/0315737 A1 | 10/2016 | Seo et al. | |
| 2018/0049234 A1* | 2/2018 | Lee | H04L 1/1822 |
| 2019/0260517 A1* | 8/2019 | Liu | H04L 1/1621 |
| 2019/0342865 A1* | 11/2019 | Shin | H04W 72/0446 |

FOREIGN PATENT DOCUMENTS

| | | | | |
|---|---|---|---|---|
| CN | 102474391 A | 5/2012 | | |
| CN | 104769877 A | 7/2015 | | |
| CN | 109792330 A | 5/2019 | | |
| EP | 2988447 A1 | 2/2016 | | |
| WO | WO-2012010000 A1 * | 1/2012 | ........... | H04L 1/0003 |
| WO | 2013147664 A1 | 10/2013 | | |
| WO | WO-2017148510 A1 * | 9/2017 | | |

OTHER PUBLICATIONS

Chinese Office Action with English Summary Translation dated Oct. 11, 2021 for Patent Application No. 201780087735.4, consisting of 11-pages.

Chinese Office Action with English Summary Translation dated May 31, 2022 for Patent Application No. 201780087735.4, consisting of 15-pages.

3GPP TSG RAN WG1 Meeting #86 R1-166105; Title: Discussion on timing relations for NR frame structure; Agenda item: 8.1.3.2; Source: Huawei, HiSilicon; Document for: Discussion and decision; Date and Location: Aug. 22-26, 2016, Gothenburg, Sweden, consisting of 4-pages.

* cited by examiner

RE-TRANSMISSION TIMING FOR ACKNOWLEDGMENT SIGNALING

CROSS-REFERENCE TO RELATED APPLICATIONS

This application is a Submission Under 35 U.S.C. § 371 for U.S. National Stage Patent Application of International Application Number: PCT/SE2017/050201, filed Mar. 3, 2017 entitled "RE-TRANSMISSION TIMING FOR ACKNOWLEDGEMENT SIGNALING," the entirety of which is incorporated herein by reference.

TECHNICAL FIELD

The present disclosure pertains to wireless communication technology, in particular in the context of Radio Access Technology (RAT) and/or a Radio Access Network (RAN).

BACKGROUND

In wireless communication technology, acknowledgement signaling is often used to ensure reliable transmission of data, e.g. in the context of ARQ (Acknowledgement Repeat reQuest) or HARQ (Hybrid Acknowledgement Repeat reQuest) technology. The acknowledgement signaling usually indicates whether transmission of data has been successful, e.g. based on an error detection procedure. If the data has not been received correctly, the (intended) receiver provides a corresponding signal (e.g. a NACK signal) to the transmitter, and the transmitter resend the data. If the data has been received correctly, a corresponding signal (e.g. ACK) may be send, and the transmitter proceeds sending other, new data.

SUMMARY

It is an object of this disclosure to improve acknowledgement signaling, in particular in the context of timing. This may in particular provide advantages regarding latency of transmissions.

Accordingly, there is disclosed a method of operating a (e.g., first) radio node in a Radio Access Network, RAN. The method comprises transmitting, according to a transmission timing, a data element of a data stream associated to an acknowledgement signaling process. The transmission timing is determined based on a retransmission indication indicating whether the data element is to be transmitted the first time in the data stream, or is to be retransmitted in the data stream.

There is also disclosed a (e.g., first) radio node for a Radio Access Network, RAN. The radio node is adapted for transmitting, according to a transmission timing, a data element of a data stream associated to an acknowledgement signaling process. The transmitting timing is determined based on a retransmission indication indicating whether the data element is to be transmitted the first time in the data stream, or is to be retransmitted in the data stream. The radio node may comprise radio circuitry, in particular a transmitter, and/or processing circuitry and/or a transmitting module for, and/or operable for, such transmitting.

A method of operating a (e.g., second) radio node in a Radio Access Network, RAN is suggested. The method comprises transmitting acknowledgement signaling associated to a data stream, the acknowledgement signaling comprising a retransmission indication, which indicates whether the data stream has been correctly received or not. The retransmission indication is determined based on associating, with the data stream, a data element received at a reception timing, wherein the reception timing is determined based on whether the data element is scheduled for a first transmission in the data stream, or is scheduled to be retransmitted in the data stream.

Moreover, a (e.g., second) radio node for a Radio Access Network, RAN is described. The radio node is adapted for transmitting acknowledgement signaling associated to a data stream, the acknowledgement signaling comprising a retransmission indication, which indicates whether the data stream has been correctly received or not. The retransmission indication is determined based on associating, with the data stream, a data element received at a reception timing, wherein the reception timing is determined based on whether the data element is scheduled for a first transmission in the data stream, or is scheduled to be retransmitted in the data stream. The radio node may comprise radio circuitry, in particular a transmitter, and/or processing circuitry and/or a transmitting module for, and/or operable for, such transmitting.

The approaches described herein allow adapting the timing associated to acknowledgement signaling, and/or data transport, to be dependent on operating conditions like the success of acknowledgement signaling processes. This allows flexible handling and utilising latency-improving measures, e.g. earlier transmission of data elements to be resent or retransmitted.

Transmitting according to a transmission timing may comprise transmitting such that the transmitted signaling is transmitted in a defined time-relation to the transmission timing, e.g. within a time interval indicated by the transmission timing, and/or starting and/or ending at or within the transmission timing. A timing may generally indicate a time interval or a point in time, in particular in relation to a time structure utilised and/or defined and/or configured for communication, e.g. by a radio node and/or a network. Receiving signaling, e.g. a data element, at a reception timing may comprise receiving or expecting to receive the data element within a time interval indicated by the reception timing, and/or starting and/or ending at or within the reception timing.

The data stream may generally comprise one or more data elements. The data elements of the data stream may represent the same content and/or payload.

Determining the acknowledgement signaling and/or the retransmission indication may comprise performing error evaluation based on the data element, which may comprise and/or be based on error evaluation of one or more other data elements, which might have been received in parallel and/or earlier. Associating a data element with a data stream may comprise expecting and/or assuming that a data element received at the reception timing belong to the data stream, and/or performing error evaluation for that data stream based on such assumption and/or based on or including the data element. This may include determining that such a data element is missing/not received.

Scheduling information may generally be configured by a radio node for itself, or for one or more other radio nodes, which may be configurable for or with such. For example, a network node may configure a terminal or user equipment or wireless device with scheduling information (e.g. by transmitting corresponding control information and/or configuration or allocation data), and/or configure itself with the same or corresponding information.

A reception interval and a transmission interval may be mapped (and/or synchronized) to each other, in particular in a one-to-one mapping, e.g. based on signal travel time between the associated receiver and transmitter.

The transmission timing may indicate a transmission time interval (in particular a TTI according to a standard), e.g. a slot or mini-slot or subframe, in which to transmit the data element after reception of the retransmission indication. Alternatively, or additionally, the reception timing may indicate a reception time interval, e.g. a slot or subframe, in which the data element is scheduled to be received. The reception time interval may correspond to a transmission time interval, in particular in terms of a timing structure used and/or associated to the transmission. A transmission time interval and/or reception time interval may be defined and/or configured by a network or network node. A transmission time interval and/or reception time interval may be identified or identifiable by an integer number or counter. It should be noted that the exact position (in time) of signaling (e.g., of a data element) in an interval may be dependent on additional information and/or conditions.

There may be considered that a time interval between the timing of reception of the retransmission indication and the transmission timing for a data element to be retransmitted is different, in particular shorter, than the time interval between the timing of reception of the retransmission indication and the transmission timing for a data element to be transmitted for the first time. Such a time interval may be represented and/or indicated and/or referred to by a number (in particular, an integer number) of transmission time intervals.

The acknowledgment signaling process may in particular be a HARQ process or an ARQ process.

It may be considered that the retransmission indication comprises and/or is implemented as ACK/NACK signaling, and/or a NDI (New Data Indication or Indicator). A NDI may be determined based on received acknowledgement signaling.

In particular, a NDI may be determined if acknowledgement signaling indicates correct reception and/or decoding of a data stream or data element.

In some variants, it may be considered that if reception of the retransmission indication is scheduled or occurring in transmission time interval n, the transmission timing indicates a transmission time interval n+k for transmitting the data element, wherein k for a retransmission of the data element is smaller than k for a first transmission of a data element.

It some variants, the transmission timing or reception timing, alternatively or additionally to being based on the retransmission indication, may be based on an allocation of resources for transmitting or receiving the data element, and/or a redundancy indication pertaining to the data element and/or the data stream, and/or a size of the data element. Allocation of resource may represent and/or be based on scheduling information, and/or indicate a number of resource elements and/or specific resources, which may pertain to a transmission time interval or reception time interval (and/or for corresponding transmission or reception of a data element). An allocation of resources may indicate a size of allocated resources, e.g. in terms of number of resource element, and/or frequency and/or time intervals covered and/or allocated.

The (transmission or reception) timing may be determined based on a comparison of resource allocation and/or redundancy indication and/or size pertaining to different data elements, in particular between a data element already transmitted or received (respectively, expected to already be received) and a data element scheduled for (in particular future) transmission and/or reception. A redundancy indication may represent a redundancy value, and/or represent the number of transmission of the data element, and/or the relevance of correct transmission of the data element, e.g. based on number of (re)transmission and/or time already needed for transmission. The latter may be relevant for example in cases in which, after a latency requirement cannot be fulfilled any more, the relevance of the data stream being correctly transmitted or being transmitted at all, drops significantly. The size of a data element may indicate the total size, and/or the size of the data content, and/or the transport block size (TBS).

It may be considered that the transmission timing and/or reception timing is determined based on a transmission mode or transmission level. For example, the timing/s may be determined as described herein for specific transmission mode/s and/or level/s, e.g. such with strong latency requirement/s (e.g., low latency), in particular for URLLC (Ultra-Reliable Low Latency Communication). A transmission level may be based on, and/or pertain to a reliability level and/or latency level. Such a level (or levels) may be represented or indicated by a corresponding indication or indicator, and/or be associated to or pertain to the data to be transmitted using the one or more data streams. A level or indication may be indicated directly/explicitly, or indirectly/implicitly. A reliability level may be indicated by, and/or represent, a desired and/or required error rate and/or error probability, for example a Block Error Rate (BLER), and/or indicate a maximum number of errors or some similar. A latency level may indicate a desired or required latency and/or response speed. A transmission level may for example be indicated by a quality of service requirement and/or indication, and/or the number of data streams associated to transmitting the data and/or a transmission mode. A transmission level may for example indicate Ultra Reliable Low Latency Communication (URLLC). There may be defined different transmission levels, with several levels of reliability and/or latency. Whether to determine timing based on whether the data element is re-transmitted or not, may be determined based on an indication indicating the transmission level for the data (e.g., relating to a bearer or channel associated to the data). Such an indication, in particular a transmission level indication, may be provided for, and/or pertain to, a bearer and/or logical or transport channel, from which the data streams may be provided.

Alternatively, or additionally, there may be provided (e.g., transmitted or determined) and/or obtained a switching indicator indicating and/or configuring a radio node to determine timing based on whether a data element is to be retransmitted or not. This switching indicator may be determined based on a transmission level and/or transmission level indicator.

There may be considered a program product comprising instructions causing processing circuitry to control and/or perform any one of the methods described herein.

Also, a carrier medium arrangement carrying and/or storing a program product as described herein may be considered.

Generally, a transmission data stream (or, shorter, data stream) may comprise one or more data elements. A data element may represent a data block, e.g. a transport block and/or MAC (Medium Access Control, a layer of a RAN) data structure. To each data element there may be assigned a data content and/or payload (which may be referred to simply as "data"), e.g. user data and/or control data. The data content of data elements of the same data stream may represent and/or consist of the same data, e.g. the same bit pattern. Additionally, a data element may comprise transport information, e.g. related to coding and/or error coding and/or mapping and/or modulation. Such transport information may be equal or different for the data elements of the same data stream. Different data elements (of the same data stream, or of different data streams) may be transmitted with the same Modulation and Coding Scheme (MCS), or in some variants may have different MCS. It may be considered that a data stream is associated to, and/or is defined by and/or in relation to a specific acknowledgement signaling process, e.g. a HARQ process or ARQ process. In the acknowledgement signaling process, data element/s having the same data content/payload (being of the same data stream) may be transmitted or retransmitted until they have been received correctly, e.g. as indicated by acknowledgement signaling. Different acknowledgment signaling processes may differ in for example regarding their process identifiers, and/or associated entities, e.g. HARQ and/or ARQ entities. If an acknowledgement signaling process has led to correct transmission of the associated data, the same acknowledgement signaling process may be (re-) used for transmitting different data (content) in a new data stream, the successfully transmitted stream/s being cancelled.

A transmission data stream may be considered a sub-stream or part of a larger data stream, which may be associated to a specific bearer and/or logical or transport channel. The bearer or channel may be mapped to two or more acknowledgement signaling processes, which may handle pieces (in data blocks or data elements) of the larger stream as data stream, until a piece has been correctly decoded, and a new piece is handled in new data streams. It may be considered that acknowledgement signaling comprises signaling and/or one or more signals or messages associated to a data stream, e.g. signals or messages indicating whether the data stream has been correctly decoded or not. Such signaling may be referred to as part of the data stream for ease of reference, but pertains to the opposite communication direction the data elements of the stream are transmitted.

Acknowledgement signaling may be determined based on, and/or determining such may comprise, receiving one or more data streams, respectively one or more data elements of such stream/s, e.g. utilising a receiver and/or processing circuitry and/or a receiving module, which may be part of a radio node, or with which a radio node may be implemented. Alternatively, or additionally, acknowledgement signaling may be determined based on scheduling information indicating that one or more data streams and/or related data elements should be transmitted. Such scheduling information may for example be provided or transmitted by a radio node transmitting at least one of the data streams, and/or may be comprised in control information, e.g. Downlink Control Information. Scheduling information may be obtained by the radio node determining the acknowledgement signaling, e.g. received from another radio node, or scheduled itself, e.g. when configuring or scheduling uplink transmission or sidelink transmission of data stream/s for another node. Scheduling information may indicate a downlink grant and/or an uplink grant, which may configure downlink and/or uplink resources for reception or transmission by a configured wireless device or terminal. Acknowledgment signaling may in particular be based on, and/or represent, non-reception of one or more data elements, respectively may indicate such, e.g. as DTX signal instead of NACK. Non-reception may e.g. be determined based on scheduling information. Alternatively, or additionally, reception of one or more data elements without corresponding scheduling information (received and/or decoded) may be indicated, e.g. as a variant of DTX or similar signal. However, in some variants, non-reception of acknowledgement signaling, e.g. pertaining to one or more data streams and/or acknowledgement signaling processes, may be considered as DTX event, e.g. by the node receiving or expecting to receive such signaling.

Generally, acknowledgement signaling may comprise one or more bits for each data stream and/or acknowledgement signaling process.

Different transmission data streams may pertain to different HARQ (Hybrid Acknowledgement Repeat reQuest) processes, or different transmission data streams may pertain to different ARQ processes (Acknowledgement Repeat reQuest).

Error evaluation may comprise decoding of error coding, in particular error detection and/or error determination pertaining to a data element associated to a transmission data stream. Error evaluation may generally comprise determining whether a data element has been scheduled and/or received, and/or whether the data of the data element is received and/or decoded correctly, e.g. based on error coding. Error evaluation may comprise soft combining of data elements, e.g. combining information and/or data from multiple data elements (e.g. representing the same data) to determine correctness and/or for decoding.

Error detection may comprise detecting the presence of one or more errors in a data element and/or data stream, e.g. based on error detection coding. Error determination may comprise determining and/or locating and/or correcting for one or more errors, e.g. based on forward error coding and/or one or more other data elements of the data stream/s, which may already be received. Acknowledgement signaling may indicate acknowledgment if no error is detected and/or all errors have been corrected for and/or when a data stream and/or its associated elements have been decoded correctly (e.g., as determined in the framework or context of the error evaluation).

Acknowledgement signaling may generally represent a result of, and/or be based on, error evaluation. It may comprise two or more signals, which may be transmitted on different channels and/or carriers. Each signal may be associated to one acknowledgement signaling process and/or data stream. In some alternatives, at least one signal may be associated to more than one acknowledgement signaling process and/or data stream, e.g. indicating a combined error evaluation result, and/or be transmitted on one carrier and/or channel and/or for one acknowledgement signaling process only. In this case, the signaling may comprise only one signal in total, which may represent the combined error evaluation result for all data streams. In some variants it may be considered that such acknowledgement signaling (e.g. is transmitted with equal content one more than one carrier and/or channel, e.g. in a carrier aggregation. Acknowledgement signaling may comprise different and/or individual and/or separate signals for different data streams and/or different acknowledgment signaling processes, allowing multiple-layered feedback (e.g., relating to DTX/ACK/NACK). Different or separate signals may be associated and/or transmitted with different messages, e.g. different control information messages, e.g. DCI messages or UCI messages. Different messages may be transmitted on the same or different channels and/or carriers.

Signaling, or a message, comprising scheduling information and/or acknowledgement signaling may be considered and/or implemented as one or more control information messages. For example, a Downlink Control Information (DCI) message and/or a scheduling message (which may schedule and/or indicate scheduling intention for a data element and/or stream) may be considered examples of such control information messages. A message of, and/or comprising, acknowledgment signaling may generally also be considered a control information message. Examples of such a control information message comprise Uplink Control Information (UCI) messages, and/or acknowledgement messages.

Control signaling may be considered signaling of, and/or comprising, control information. Control information may be provided in a control information message. Control information may comprise a retransmission indication (e.g., ACK/NACK and/or NDI), and in some variants in addition scheduling information like a grant (of uplink and/or downlink resource/s), e.g. for the downlink or downlink control information. In other cases, control information may comprise acknowledgement signaling (respectively, associated acknowledgement information), and in some variants in addition scheduling requesting information and/or measurement-related information, e.g. for the uplink or uplink control information.

There may be considered a variant in which at least two acknowledgement signaling processes (e.g., HARQ processes) are logically paired, e.g. for multi-antenna transmissions and/or MIMO (Multiple-Input, Multiple-Output) operation, such if one data stream is associated to one specific process (e.g., having a specific identifier, like a number, e.g. 0 or 1), a second data stream handled in parallel is automatically associated to another specific process (e.g., 7 if the first is 0, and 8 if the first is 1, other number association are possible). Such process association may be predefined (according to a standard used) and/or preconfigured (e.g., being configured by a network/network node).

Obtaining information or an indication, e.g. scheduling information and/or a retransmission indication, may comprise receiving such from another radio node, e.g. a network node. Alternatively, or additionally, obtaining such may comprise determining and/or configuring such by the obtaining node itself. For example, a network node may determine scheduling information and/or a retransmission indication for uplink or downlink data streams, e.g. when performing scheduling.

There is also considered a program product comprising instructions causing processing circuitry to control and/or perform any of the methods described herein.

Moreover, there is described a carrier medium arrangement carrying and/or storing any of the program products described herein.

An acknowledgement signaling process may be a process of transmitting and/or retransmitting data, based on acknowledgement signaling, e.g. acknowledgement feedback like HARQ or ARQ feedback. Acknowledgement signaling may comprise and/or represent acknowledgement information, which may represent an acknowledgment or non-acknowledgement, e.g. of correct reception of the corresponding data or data element, and optionally may represent an indication of non-reception. In particular, acknowledgment information may represent ARQ (Automatic Repeat request) and/or HARQ (Hybrid Automatic Repeat reQuest) feedback. Correct reception may include correct decoding/demodulation, e.g. according to an ARQ or HARQ process, for example based on error detection and/or forward error correction coding, which may be based on a data element being received. Correspondingly, incorrect reception (non-acknowledgement) may refer to detection of an error during decoding/demodulating. Non-reception may indicate non-reception of a data element and/or non-reception of an acknowledgement position indication indicating a mapping pertaining to the data element. Non-reception may for example be indicated by a DTX (Discontinuous Transmission) indication. It should be noted that there may be DTX on either side of a communication. The radio node determining and/or transmitting the acknowledgement signaling may not receive an expected data element of a data stream, and indicate this in the acknowledgement signaling as DTX, allowing more finely grained acknowledgment information. On the other hand, the radio node receiving acknowledgment signaling may not receive an expected acknowledgement signal (e.g., in one of the data streams), and treat this as a DTX event. Both kinds of DTX may be treated separately, e.g. as DTX1 and DTX2 or according to a different scheme.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. Acknowledgement signaling may comprise one or more bits (e.g., for ACK/NACK) for an acknowledgement signaling process, and/or comprise additional information, e.g. indicating that a data element was not received and/or scheduled.

Transmitting acknowledgement signaling may comprise encoding and/or modulating, Encoding and/or modulating may comprise error detection coding and/or forward error correction encoding and/or scrambling.

Transmitting acknowledgement signaling may be based on, and/or comprise, determining acknowledgement information pertaining to the one or more data elements. Determining such information may comprise performing an error evaluation, e.g. in the context of an ARQ and/or HARQ process and/or determining correct reception of the data element/s (and/or considering non-reception). Alternatively, or additionally, transmitting acknowledgement signaling may comprise and/or be based on receiving the data, respectively data elements, for example based on a configuration, which may be a downlink data configuration. Such a configuration may be configured by a network node. The configuration may (statically and/or dynamically, e.g. in part both) be valid for one, or more than one, time structure or TTI. However, in some cases, the configuration may be dynamically adapted for each time structure or TTI, e.g. as configured by a network node.

Acknowledgement signaling may be considered pertaining to downlink data if it comprises acknowledgement information pertaining to downlink data respectively the data element/s thereof. Downlink data may generally represent data transmitted on a downlink channel, e.g. subject to one or more ARQ or HARQ processes. A data element may in particular represent a (e.g., a single) data block (like a transport block), which may be associated to a specific ARQ/HARQ process. In particular, different data streams, respectively their data element/s, may be associated to different ARQ/HARQ processes (which may run in parallel).

Data elements of the data may be transmitted by the network node, and/or under control or monitoring by the network node, which may be adapted accordingly, and/or utilise its circuitry accordingly, and/or comprise a data transmitting module therefor. Generally, data elements may be associated to one or more different transmissions/transmission events and/or messages, in particular to transmissions at different times or different time structures or intervals, e.g. TTIs.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular acknowledgement signaling, may comprise a plurality of signals and/or messages, which may be transmitted on different carriers and/or be associated to different acknowledgement signaling processes, e.g. representing and/or pertaining to one or more such processes. An indication, in particular a retransmission indication, may comprise signaling and/or a plurality of signals and/or messages, which may be transmitted on different carriers and/or be associated to different acknowledgement signaling processes, e.g. representing and/or pertaining to one or more such processes.

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or eNodeB or gNodeB (gNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent and end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Radio circuitry may comprise one or more transmitters and/or receivers and/or transceivers (a transceiver may operate or be operable as transmitter and receiver), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries.

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

Error coding may comprise for example error detection coding (EDC) and/or forward error coding (FEC). Error coding may generally be handled (e.g., encoded and/or decoded) by processing circuitry of a radio node.

The coding (for error correction) and/or the error detection bits may be provided by performing error detection coding, in particular encoding, the size of the coding may represent or correspond to the number of error detection bits and may be referred to as coding length or error detection coding length. Error detection coding, in particular encoding, may be performed by a transmitting node and/or an EDC encoding module of the transmitting node. A coding may be represented by one or more codes and/or algorithms to be performed when coding. A coding for decoding may be complementary to a corresponding coding for encoding (and vice versa).

Analogously, the correction coding and/or the error correction bits may be provided by performing (forward) error correction coding, in particular encoding, the size of the coding may represent or correspond to the number of error correction bits and may be referred to as correction coding length or error correction coding length. Forward error correction coding, in particular encoding, may be performed by a transmitting node and/or an FEC encoding module of the transmitting node.

Encoding for error detection may comprise determining and/or calculating one or more EDC bits, in particular a predetermined number of EDC bits (corresponding to the coding length) and/or according to a chosen algorithm. In particular, encoding for error detection may comprise utilizing a CRC (Cyclic Redundancy Check) algorithm.

Encoding for forward error correction may comprise determining and/or calculating one or more FEC bits, in particular a predetermined number of FEC bits (corresponding to the correction coding length) and/or according to a chosen algorithm. In particular, encoding for forward error correction may comprise utilizing an error correcting algorithm or code, e.g. a convolutional code and/or a Hamming code and/or Reed-Solomon code and/or a Reed-Muller code and/or a turbo code, or any other suitable FEC code.

Decoding (for error detection coded data and analogously for FEC encoded data) may comprise utilizing a coding for decoding error encoded data, wherein the coding in particular may have a coding length. The coding may be configured, e.g. by a transmission node, and/or be pre-determined. Decoding error detection coding may comprise determining whether (or not) an error occurred when transmitting and/or decoding the data. Decoding error detection decoding and/or such determining may comprise determining a probability that one or more errors occurred (and/or a probability, that no error occurred), based on the error detection coding. This decoding may comprise comparing the probability (and/or corresponding parameter/s or a set of parameters) with a threshold (or corresponding threshold value). Decoding may be based on one or more data elements representing the same data, e.g. of the same data stream and/or of different data streams.

In general, acknowledgement may be indicated by the acknowledgment signaling comprising one or more acknowledgment signals or bits (ACK), the number of such signals may be dependent on the use case, and/or by acknowledgement signaling representing and/or comprising one out of a set of acknowledgement combinations. Non-acknowledgement may be indicated by acknowledgement signaling representing and/or comprising one out of a set of non-acknowledgment combinations. The sets may be subsets of the set of all possible combinations of acknowledgement signals transmitted for a plurality of processes and/or data streams. Each signal may for example indicate ACK or NACK (or one or more other states, e.g. DTX) for associated process/es, and each combination may comprise more than one such signal. Which combination/s represent/s acknowledgement (indicating new data elements to be transmitted), and which non-acknowledgment (indicating retransmission) may be preconfigured (e.g., by higher-layer signaling) and/or predefined (e.g., according to a standard).

BRIEF DESCRIPTION OF THE DRAWINGS

The drawings are provided to illustrate concepts and approaches described herein, and are not intended to limit their scope. The drawings comprise:

FIG. 4, showing an exemplary method of operating a radio node; and

FIG. 5, showing an exemplary radio node.

DETAILED DESCRIPTION

Figure 1:
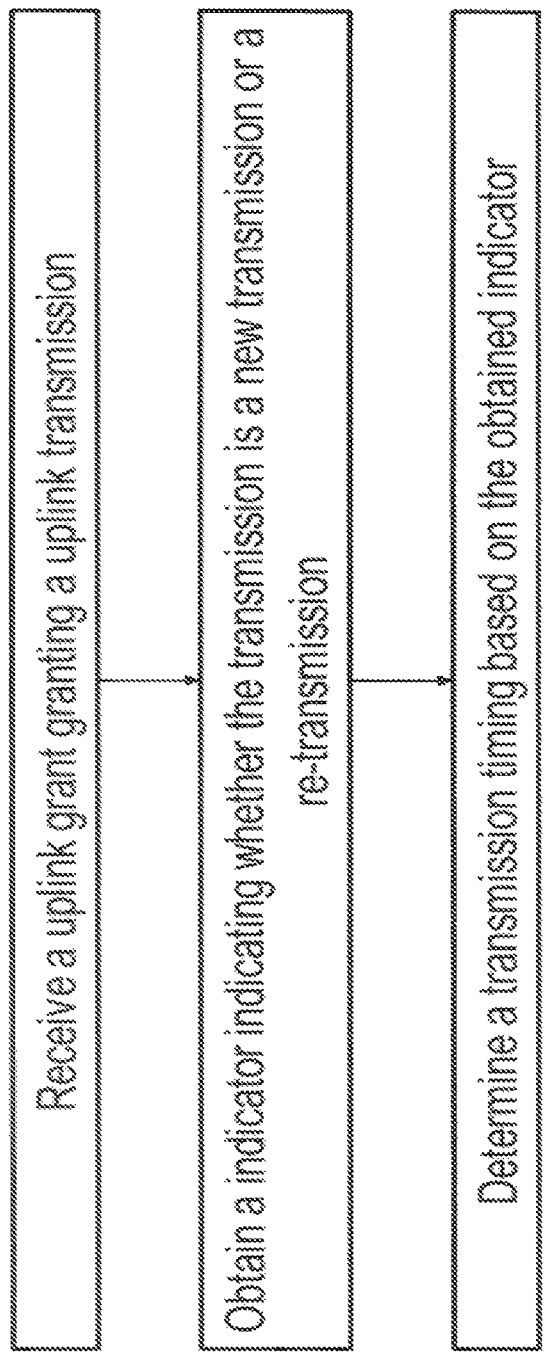
FIG. 1, showing an exemplary method of operating a radio node.

In the following, reference is made to LTE technology, for illustration and comparison. However, the approaches described are not limited thereto, and may be applied to analogous devices, structures and channels of other technologies, e.g. in the context of 5G standards, in particular 3GPP New Radio technology (NR).

In many wireless communications systems, HARQ (Hybrid Automatic Repeat Request) re-transmission is a method to mitigate un-predicable interference and channel variations, and which is an example of an acknowledgement signaling process. For downlink, when a wireless device attempted to decode a data message, it transmits an indicator to the transmitter indicating whether the decoding was successful or not. When the transmitter receives an indicator indicating un-successful decoding, the transmitter typically performs a re-transmission of the data message which the receiver typically will combine with the original received transmission. The combining is known as soft combining, of which chase and incremental redundancy are two well-known variants. The combining will greatly increase the probability of successful decoding.

In LTE, the indicator indicating the result of a decoding attempt is known as a HARQ-ACK. For LTE, in some cases up to two transport blocks (two data messages) may be transmitted in each TTI (Transmission Time Interval), which means that the HARQ-ACK may consist of 2 bits, where each bit indicates success or un-success of a respective transport block (successful reception/decoding, or an error therein).

LTE is a standard in 3GPP family of wireless systems, which is highly optimized for MBB (Mobile BroadBand) traffic. The TTI (subframe) has 1 ms duration and the HARQ-ACK is, for FDD (Frequency Division Duplex), transmitted in subframe n+4 for a data transmission in subframe n.

In LTE, there are two types of mechanisms to trigger a HARQ re-transmission from a UE:
   Adaptive re-transmission: The eNB (eNodeB, network node for LTE) transmits a UL grant on PDCCH/ePDCCH (Physical Downlink Control Channel/enhanced PDCCH) indicating that a re-transmission shall be performed
   Non-adaptive re-transmission: The eNB transmits "NACK" on the PHICH (Physical Hybrid-ARQ Indicator CHannel), which triggers the UE to perform a re-transmission.

For both re-transmissions and first transmission, the timing for the UL transmission relates to the DL subframe in which the UL grant was detected. For FDD, the timing is n+4 which means that if the UL grant was detected in DL subframe n, the corresponding UL transmission shall occur in UL subframe n+4. The reason for the 4 subframes delay before the UL transmission occurs is mainly due to time requirements for:
   Decoding the UL grant on PDCCH, or PHICH
   Building PDUs (Protocol Data Units), e.g., MAC and RLC PDUs (maybe also PDCP PDUs)
   L1 encoding, modulation and resource mapping
   That a transmission shall be a new transmission and not a re-transmission may be indicated to the UE using a toggle of a NDI (New Data Indicator) flag (which may be provided with control information or scheduling information, or determined by the UE itself based on acknowledgement signaling). By "toggle" it is meant that the NDI changes its value compare to last UL grant. For example, if the NDI had a value of "0" for the last previous transmission a NDI=0 would indicate a re-transmission while NDI=1 would indicate that transmission shall be a new transmission.

URLLC (Ultra-Reliable Low Latency Communication) is a data service with extremely strict error and latency requirements. The latency requirements may be 1 ms or lower. Having the extreme latency requirements for URLLC in mind, it is highly desirable to optimize the transmission timing, for LTE or other systems. Very short latency requirement can prohibit the usage of HARQ retransmissions if the retransmission delay is too large.

Thus, it is suggested that a radio node like a UE determines the transmission timing based on a whether the transmission is a first transmission or a re-transmission. The transmission delay can be made shorter for the re-transmission than for a first transmission.

This may provide in particular optimized uplink transmission timing (however, could be used in downlink or sidelink as well), wherein a stricter timing can be used than for a new transmission. This enables the usage of HARQ retransmissions for low latency services that would otherwise not benefit from the spectral efficiency gains of using HARQ. This is possible, since PDUs were built for the original transmission and do not need to be re-built, but also since L1 encoding does not (necessarily) need to be repeated. In some variants, the L1 encoding can change due to time dependent choice of scrambling sequence and/or due to updates of the used beam-forming/pre-coder. L1 encoding may in particular comprise utilising a MCS and/or precoding and/or link adaptation.

A flowchart illustrating a method of operating a radio node implemented as UE is illustrated in FIG. 1.

In some variants, a NDI flag indicates whether the transmission is a new transmission or a re-transmission. The UE may determine a first timing if the NDI has been toggled and second timing if the NDI has not been toggled.

In some variants, the timing may further be determined by the version of the re-transmission. In such, different values of the RV (Redundancy Version, a redundancy indication) may instruct the UE to determine different second timings depending on the RV. On the network side, the network node may determine reception timing (the time it will expect an uplink transmission) based on whether the network node schedules a new transmission or a re-transmission.

Generally, independent of the specific approach used, the timing (transmission timing and/or reception timing) may be determined by a timing adjustment or offset indicator. In some such variant, the timing adjustment indicator may be or represent a single bit that can adjust the timing one or a few TTIs.

In some variants, the determined transmission timing further depends on one or more out of:
- Whether or not the physical resources for the re-transmission are the same as the previous transmission (re-transmission or initial transmission)
- Whether or not the amount physical resources for the re-transmission are the same as the previous transmission (re-transmission or initial transmission)
- Whether or not the redundancy version of the re-transmission is the same as the previous transmission (re-transmission or initial transmission)

In some variants the retransmission is indicated with a special smaller DCI that would be associated with a re-transmission transmission delay. The DCI may indicate and/or comprise resource allocation and/or a retransmission indication and/or a redundancy indication and/or L1 encoding to be used).

Some exemplary actions performed by a radio node (UE) may comprise any one of:
Actions by the UE (accordingly expected by qNB):
- Receive a DCI for UL
- Detect toggled NDI, apply timing n+k1
- Detect non-toggled NDI for retransmission on HARQ process i
- Compare retransmission with previous transmission on process i
- Determine if TBS if different, if so apply timing n+k2
- Determine if allocation is different, if so apply timing n+k3
- Determine if RV is different, if so apply timing n+k4
- Determine if transmissions are identical, if so apply timing n+k5.

The different kn may represent different or the same values, in particular integer values indicating a number of TTIs, and may be considered examples of different k-values.

Generally, a transmitting radio node, for example, a UE (wireless device), may determine a transmission timing based on whether an uplink grant indicates a new transmission or a re-transmission, and by comparing the retransmission with the previous transmission. A receiving radio node (like a network node) may operate correspondingly. However, the roles between the radio nodes may be reversed.

Figure 2:
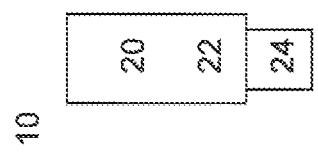
FIG. 2, showing an exemplary terminal representing a radio node.

FIG. 2 schematically shows a terminal or wireless device 10, which may be implemented as a UE (User Equipment). Terminal 10 comprises processing circuitry (which may also be referred to as control circuitry) 20, which may comprise a controller connected to a memory. Any module of the terminal, e.g. a transmitting module or receiving module, may be implemented in and/or executable by, the processing circuitry 20, in particular as module in the controller. Terminal 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the terminal 10 is connected or connectable to the radio circuitry 22 to collect or send and/or amplify signals. Radio circuitry 22 and the processing circuitry 20 controlling it are configured for cellular communication with a network, e.g. a RAN as described herein. Terminal 10 may generally be adapted to carry out any of the methods for operating a terminal or UE disclosed herein; in particular, it may comprise corresponding circuitry, e.g. processing circuitry, and/or modules.

Figure 3:
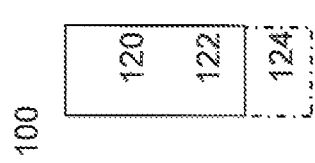
FIG. 3, showing an exemplary network node representing a radio node.

FIG. 3 schematically show a network node 100, which in particular may be an eNB, or gNB or similar for NR. Network node 100 comprises processing circuitry (which may also be referred to as control circuitry) 120, which may comprise a controller connected to a memory. Any module, e.g. transmitting module and/or receiving module and/or configuring module of the network node 100 may be implemented in and/or executable by the processing circuitry 120. The processing circuitry 120 is connected to control radio circuitry 122 of the radio node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. processing circuitry, and/or modules. The antenna 124 circuitry may be connected to and/or comprise an antenna array. The network node 100, respectively its circuitry, may be adapted to transmit configuration data and/or to configure a terminal as described herein.

FIG. 4 shows a diagram for an exemplary method of operating a radio node. The method comprises an action TS10 of transmitting acknowledgement signaling and/or transmitting a data element as described herein.

Figure 5:
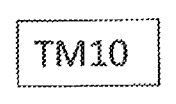

FIG. 5 shows a schematic of an exemplary radio node. The radio node may comprise a transmitting module TM10 for performing action TS10.

In the context of this disclosure, HARQ ACK/NACK (acknowledge for a correctly received block of data, not acknowledged for a not correctly received block of data) feedback may refer to feedback (e.g. a corresponding signal transmitted, which may comprise 1 or more bits) provided (e.g. on the UL) by a terminal, e.g. to a network or network node in response to data transmitted to it (e.g. on the DL). HARQ ACK//NACK information or feedback (or shorter HARQ-ACK information or feedback or HARQ information or feedback or just HARQ) may include transmitting a signal/bit indicating whether a transport block of data received by the terminal has been receiver correctly or not. HARQ and/or determining HARQ may include decoding and/or error detection procedures to determine correct reception. There may be defined a number of HARQ processes with associated HARQ ids or numbers, which may refer to individual data streams and/or associated data elements; a HARQ response or feedback from a terminal (e.g. a HARQ bit) may be associated to one of the HARQ processes or ids. In some variant, HARQ feedback may comprise one bit per DL carrier; in other variant, HARQ feedback may comprise two (or more than two) bits per carrier, e.g. dependent on the rank used. Generally, HARQ feedback may be transmitted (and/or determined, e.g. based on received signals and/or transport blocks and/or data and/or HARQ process identifiers) by a terminal, and/or a terminal may be adapted for, and/or comprise a HARQ module for, determining (e.g., as mentioned above) and/or transmitting HARQ feedback, in particular based on and/or using a configuration and/or a modulation configured, e.g. a modulation determined and/or configured as described herein. Transmitting HARQ may generally be performed on a UL control channel, e.g. PUCCH.

A first transmission of a data element (e.g., in a data stream), may also be referred to as initial transmission.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node. Transmitting in sidelink may pertain to transmission from one terminal to another. Transmitting acknowledgement signaling may be in downlink, uplink or sidelink, and/or may pertain to a corresponding data stream or data element in uplink, downlink or sidelink, respectively.

Signaling may generally comprise one or more signals and/or one or more symbols. Reference signaling may comprise one or more reference signals or symbols.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE.

A resource generally may represent a time-frequency resource, on which signaling according to a specific format may be transmitted and/or be intended for transmission. The format may comprise one or more substructures, which may be considered to represent a corresponding sub-resource (as they would be transmitted in a part of the resource).

Control information or a control information message or corresponding signaling may be transmitted on a control channel, e.g. a physical control channel, which may be a downlink channel or uplink channel. For example, the acknowledgement signaling and/or the retransmission indication may be signaled by a network node on PDCCH (Physical Downlink Control Channel) and/or a PDSCH (Physical Downlink Shared Channel) and/or a HARQ-specific channel. Acknowledgement signaling and/or the retransmission indication may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling. Data may be transmitted on associated channels, e.g. PUSCH or PDSCH.

The term transmission time interval (TTI) may correspond to any time period over which a physical channel can be encoded and optionally interleaved for transmission. The physical channel may be decoded by the receiver over the same time period (TO) over which it was encoded. Examples of TTI comprise short TTI (sTTI), transmission time, slot, sub-slot, mini-slot, mini-subframe etc. A TTI may comprise a one or more symbol time intervals, and/or one or two slot time intervals, wherein e.g. 7 symbol time intervals may correspond to a slot time interval. Time interval-related terms may be considered to follow 3GPP nomenclature. A mini-slot or shortened slot or short TTI may correspond to a plurality of symbol time intervals, e.g. 2 or 3 or 4 or 5 or 6 or 7 symbol time intervals.

Configuring a radio node, in particular a terminal or user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g., regarding a freeze interval and/or a transmission start interval. A radio node may configure itself, e.g., based on configuration data received from a network or network node. A network node may utilise, and/or be adapted to utilise, its circuitry/ies for configuring.

Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink signaling, in particular acknowledgement signaling, and/or configuring resources and/or a resource pool therefor.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency space and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency space and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

A carrier may generally represent a frequency range or band. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency space.

It should be noted that the term "radio" in this disclosure may be considered to pertain to wireless communication in general, and may also include wireless communication utilising microwave frequencies.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink. Acknowledgement signaling, as well as signaling of an acknowledgement position indication may be considered examples of SCI, albeit in different directions of communication between participants. In particular, acknowledgement signaling may be considered to be in response to other control signaling (e.g., configuring control signaling), and thus be referred to as response control signaling. Configuring control signaling generally may configure a UE, e.g. schedule resources and/or a resource pool. Signaling of an acknowledgment position indication may be considered an example of configuring control signaling.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise:

| Abbreviation | Explanation |
| --- | --- |
| UE | User Equipment |
| NDI | New Data Indicator |
| RVI | Redundancy Version Indicator |

The invention claimed is:

1. A method of operating a radio node in a Radio Access Network, RAN, the method comprising:
   transmitting, according to a transmission timing, a data element of a data stream associated to an acknowledgement signaling process, the transmission timing being determined based on:
      a retransmission indication indicating whether one of:
         the data element is to be transmitted the first time in the data stream; and
         the data element is to be retransmitted in the data stream; and
      a comparison of a first redundancy indication corresponding to the data element to be transmitted the first time and a second redundancy indication corresponding to the data element to be retransmitted, at least one of the first and second redundancy indications pertaining to at least a size of the data element, the transmission timing indicating a transmission time interval in which to transmit the data element after reception of the retransmission indication.

2. The method according to claim 1, wherein the data stream comprises at least one data element.

3. The method according to claim 1, wherein the data elements of the data stream represent at least one of the same content and payload.

4. The method according to claim 1, wherein
   a reception timing indicates a reception time interval in which the data element is scheduled to be received after transmission of acknowledgment signaling.

5. The method according to claim 1, wherein a time interval between the timing of reception of the retransmission indication and the transmission timing for the data element to be retransmitted is different than the time interval between the timing of reception of the retransmission indication and the transmission timing for the data element to be transmitted for the first time.

6. The method according to claim 1, wherein the acknowledgment signaling process is one of a HARQ process and an ARQ process.

7. The method according to claim 1, wherein the retransmission indication at least one of comprises and is implemented as ACK/NACK signaling.

8. The method according to claim 1, wherein, when reception of the retransmission indication is one of scheduled and occurring in transmission time interval n, the transmission timing indicates a transmission time interval n+k for transmitting the data element, wherein k for a retransmission of the data element is smaller than k for a first transmission of the data element.

9. The method according to claim 1, wherein the transmission timing is further based on at least one of:
   an allocation of resources for transmitting the data element; and
   the at least one of the first and second redundancy indications further pertaining to at least one of:
      the data element; and
      the data stream.

10. A radio node for a Radio Access Network, RAN, the radio node comprising processing circuitry to configure the radio node to:
   transmit, according to a transmission timing, a data element of a data stream associated to an acknowledgement signaling process, the transmission timing being determined based on:
   a retransmission indication indicating whether one of:
   the data element is to be transmitted the first time in the data stream; and
   the data element is to be retransmitted in the data stream; and
   a comparison of a first redundancy indication corresponding to the data element to be transmitted the first time and a second redundancy indication corresponding to the data element to be retransmitted, at least one of the first and second redundancy indications pertaining to at least a size of the data element, the transmission timing indicating a transmission time interval in which to transmit the data element after reception of the retransmission indication.

11. A method of operating a radio node in a Radio Access Network, RAN, the method comprising:
   transmitting acknowledgement signaling associated to a data stream, the acknowledgement signaling comprising a retransmission indication, which indicates whether the data stream has been correctly received or not, the retransmission indication being determined based on associating, with the data stream, a data element received at a reception timing, the reception timing being determined based on:
      whether the data element is one of:
         scheduled for a first transmission in the data stream; and
         scheduled to be retransmitted in the data stream; and
      a comparison of a first redundancy indication corresponding to the data element scheduled for the first transmission and a second redundancy indication corresponding to the data element scheduled to be retransmitted, at least one of the first and second redundancy indications pertaining to at least a size of the data element, the reception timing indicating a reception time interval in which the data element is scheduled to be received after transmission of the acknowledgment signaling.

12. The method according to claim 11, wherein the data stream comprises at least one data element.

13. The method according to claim 11, wherein the data elements of the data stream represent at least one of the same content and payload.

14. The method according to claim 11, wherein
   a transmission timing indicates a transmission time interval in which to transmit the data element after reception of the retransmission indication.

15. The method according to claim 11, wherein a time interval between the timing of reception of the retransmission indication and the transmission timing for the data element to be retransmitted is different than the time interval between the timing of reception of the retransmission indication and the transmission timing for the data element to be transmitted for the first time.

16. The method according to claim 11, wherein the acknowledgment signaling process is one of a HARQ process and an ARQ process.

17. The method according to claim 11, wherein the retransmission indication at least one of comprises and is implemented as ACK/NACK signaling.

18. The method according to claim 11, wherein, when reception of the retransmission indication is one of scheduled and occurring in transmission time interval n, the transmission timing indicates a transmission time interval n+k for transmitting the data element, wherein k for a retransmission of the data element is smaller than k for a first transmission of the data element.

19. The method according to claim 11, wherein the reception timing is further based on at least one of:
   an allocation of resources for transmitting the data element; and
   the at least one of the first and second redundancy indications further pertaining to at least one of:
   the data element; and
   the data stream.

20. A radio node for a Radio Access Network, RAN, the radio node comprising processing circuitry to configure the radio node to:
   transmit acknowledgement signaling associated to a data stream, the acknowledgement signaling comprising a retransmission indication, which indicates whether the data stream has been correctly received or not, the retransmission indication being determined based on associating, with the data stream, a data element received at a reception timing, the reception timing being determined based on:
   whether the data element is one of:
   scheduled for a first transmission in the data stream; and
   scheduled to be retransmitted in the data stream; and
   a comparison of a first redundancy indication corresponding to the data element scheduled for the first transmission and a second redundancy indication corresponding to the data element scheduled to be retransmitted, at least one of the first and second redundancy indications pertaining to at least a size of the data element, the reception timing indicating a reception time interval in which the data element is scheduled to be received after transmission of the acknowledgment signaling.

* * * * *